United States Patent
Chamandy et al.

(10) Patent No.: US 7,247,214 B2
(45) Date of Patent: Jul. 24, 2007

(54) FABRIC GARMENT LABEL HAVING DETECTABLE EAS OR RFID MARKER IN POCKET AND METHOD OF MAKING SAME

(75) Inventors: Paul A. Chamandy, Ithaca, NY (US); Rudolph J. Klein, Centerville, OH (US)

(73) Assignee: Paxar Corporation, White Plains, NY (US)

( * ) Notice: Subject to any disclaimer, the term of this patent is extended or adjusted under 35 U.S.C. 154(b) by 460 days.

(21) Appl. No.: 10/216,272

(22) Filed: Aug. 9, 2002

(65) Prior Publication Data

US 2004/0035526 A1    Feb. 26, 2004

(51) Int. Cl.
*B29C 65/48* (2006.01)
*B32B 37/12* (2006.01)
*B32B 37/26* (2006.01)
*G08B 13/14* (2006.01)

(52) U.S. Cl. ............... 156/249; 156/252; 156/293; 156/423; 340/572.8; 340/572.9

(58) Field of Classification Search ........... 340/572.8, 340/572.9; 156/252, 253, 293, 423, 249
See application file for complete search history.

(56) References Cited

U.S. PATENT DOCUMENTS

| 4,254,868 | A | | 3/1981 | Humble |
| 4,360,355 | A | * | 11/1982 | Suominen .............. 156/252 |
| 4,650,219 | A | * | 3/1987 | Sigman .................. 283/70 |
| 4,809,904 | A | * | 3/1989 | Yasutaniya ............ 229/68 R |
| 5,583,489 | A | | 12/1996 | Loemker et al. |
| 5,624,514 | A | * | 4/1997 | Frowein .............. 156/269 |
| 5,896,087 | A | | 4/1999 | Frowein |
| 5,969,612 | A | | 10/1999 | Gadonniex et al. |
| 6,019,540 | A | * | 2/2000 | Senior .................. 283/81 |
| 6,067,015 | A | | 5/2000 | Lian et al. |
| 6,091,333 | A | * | 7/2000 | Oshima .............. 340/572.8 |
| 6,206,071 | B1 | * | 3/2001 | Majkrzak et al. ....... 156/519 |
| 6,724,311 | B1 | * | 4/2004 | Kolton et al. ......... 340/572.8 |
| 2003/0117283 | A1 | * | 6/2003 | Elworthy et al. ..... 340/572.8 |

FOREIGN PATENT DOCUMENTS

| DE | 3313879 | * | 10/1984 |
| EP | 573720 | * | 12/1993 |
| GB | 2165206 | * | 4/1986 |
| GB | 2238037 | * | 5/1991 |

* cited by examiner

*Primary Examiner*—Steven D. Maki
(74) *Attorney, Agent, or Firm*—Joseph J. Grass

(57) ABSTRACT

There is disclosed a fabric label, a method of making a label, a method of marking a garment, and a tool for inserting a marker. The label preferably has a closed or essentially closed pocket, into which a marker, such as an electronic article surveillance (EAS) or radio frequency identification device (RFID) marker is inserted after the pocket has been formed. In one embodiment the marker is inserted through a slit in the pocket and in other embodiment the marker is inserted into a closed pocket by a hollow needle which has penetrated through a wall of the pocket.

15 Claims, 3 Drawing Sheets

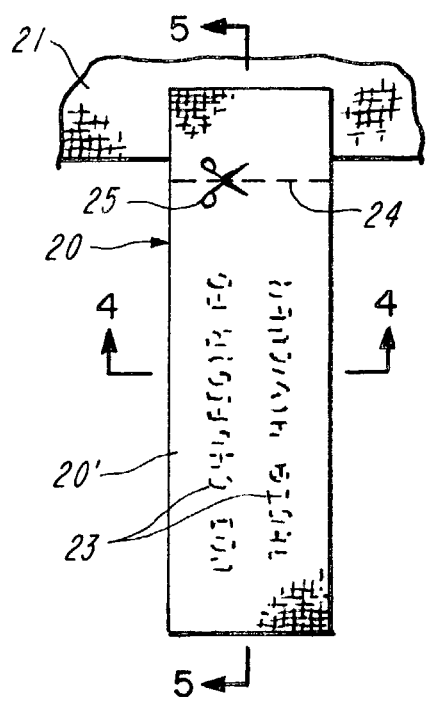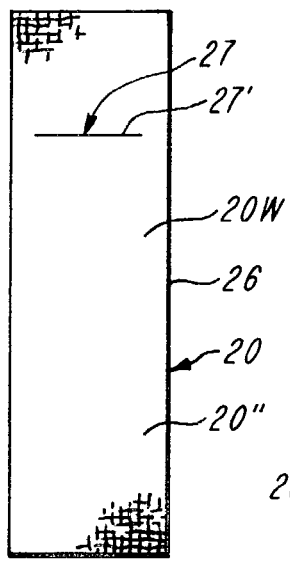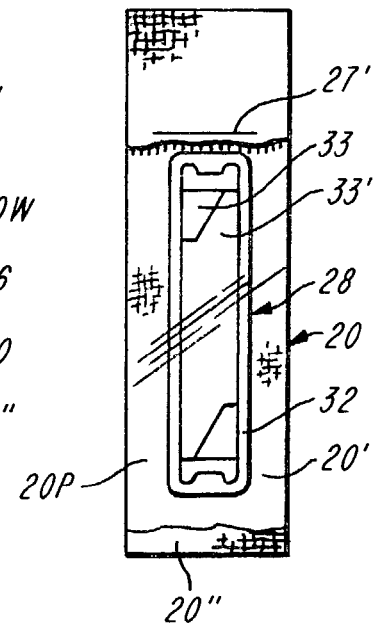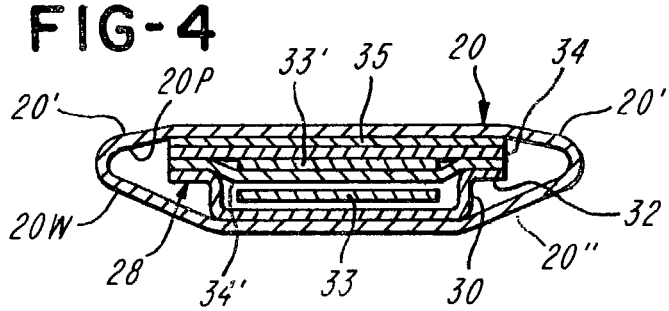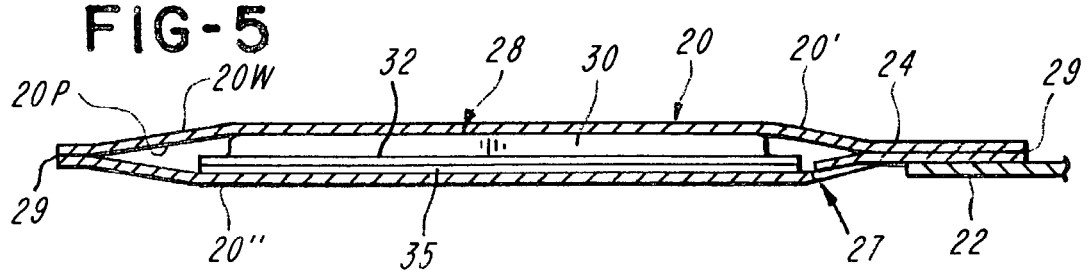

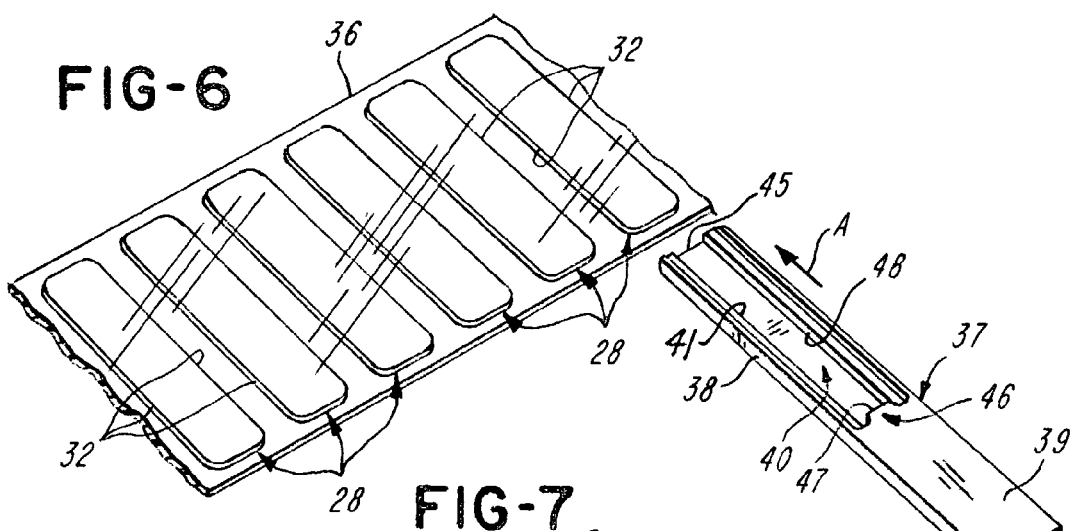
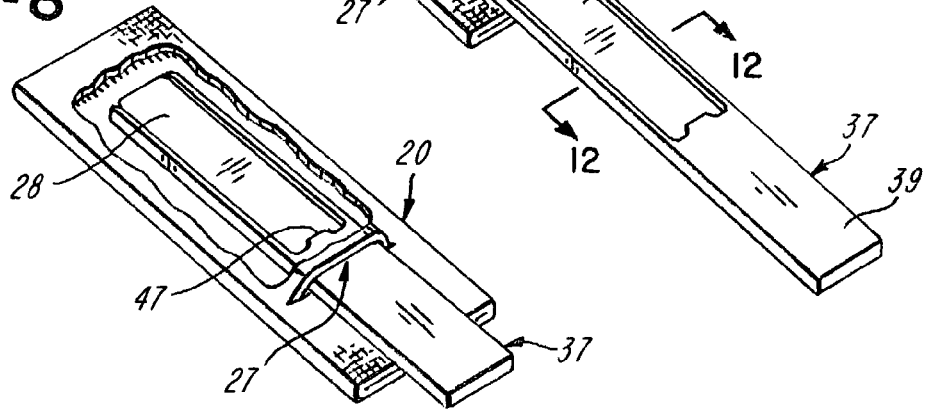
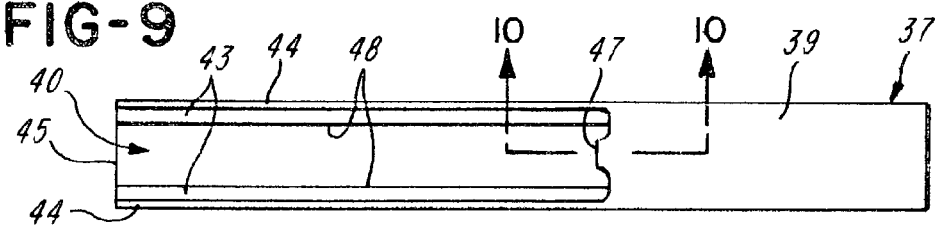
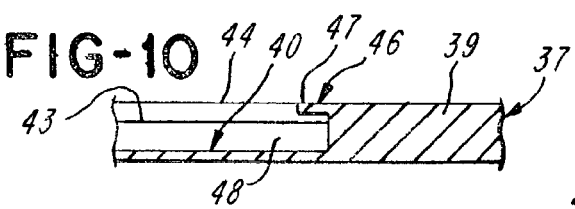
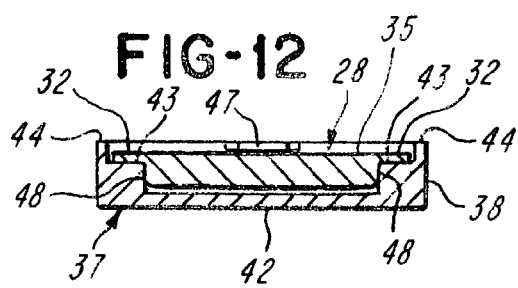
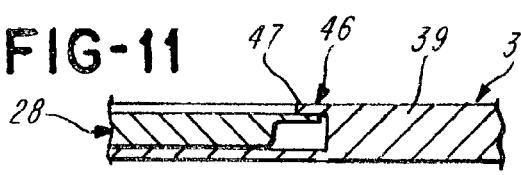

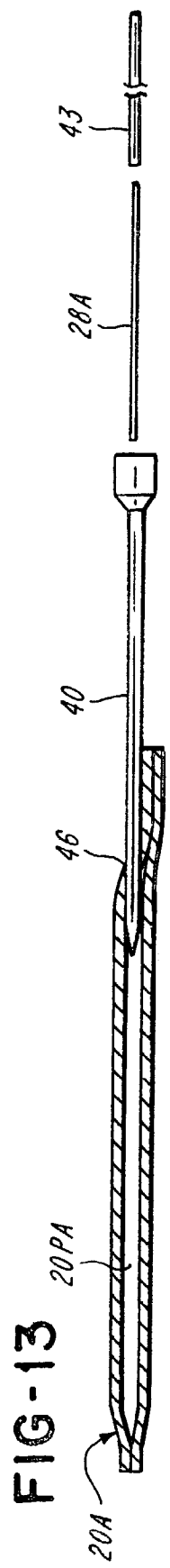
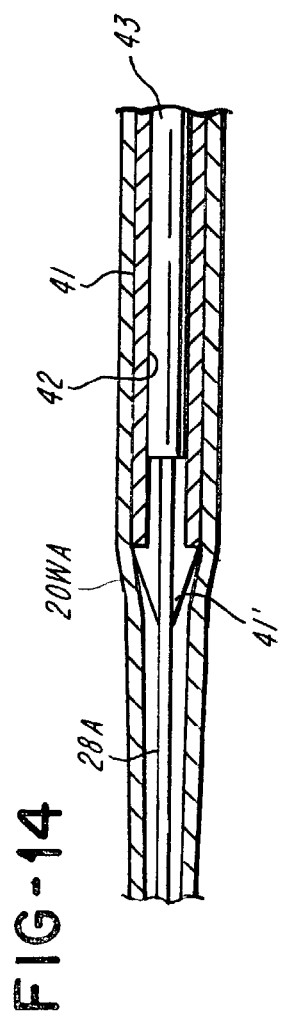
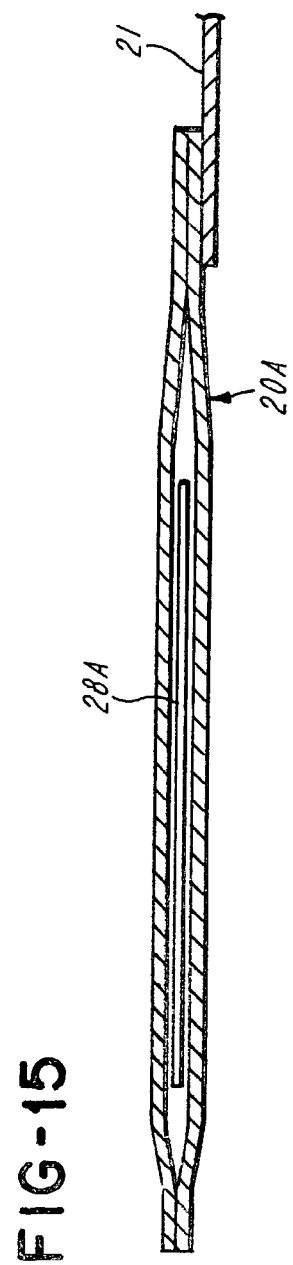
FIG-13
FIG-14
FIG-15

FABRIC GARMENT LABEL HAVING DETECTABLE EAS OR RFID MARKER IN POCKET AND METHOD OF MAKING SAME

BACKGROUND OF THE INVENTION

1. Field of the Invention

This invention relates to a label, a method of making a label, a method of marking a garment or the like, and a tool for inserting a marker.

2. Brief Description of the Prior Art

U.S. Pat. No. 5,583,489 to Thomas R. Loemker et al; U.S. Pat. No. 5,869,612 to Dennis M. Gadonniex et al; and U.S. Pat. No. 6,067,015 to Ming-Ren Lian et al are made of record.

It has been known to insert a marker into the open end of a tubular label prior to permanently closing that open end using a push rod having a terminal end which abuts the marker and pushes the marker to the inside of the tubular label.

As illustrated in U.S. Pat. No. 5,583,489, markers such as security devices have been disclosed as being applied to garments, soft goods such as towels and socks, shoes and the like. The marker is included in the label during the label manufacturing process. It is necessary to provide labels on garments and the like in order to provide care information relating to washing or dry cleaning, and as to the material or materials of which the garment is composed, country of origin, and so on. While every garment requires a label for this purpose sewn into or heat sealed by the garment manufacturer during the manufacturing process, not every retailer desires that garments in the retailer's store incorporate a marker such as an electronic article surveillance (EAS) device, a radio frequency identification device (RFID) or the like. This may be due to the fact that different retailers have different EAS and RFID systems, or that the retailer may desire to have markers in labels for only certain merchandise, or use them only in stores which have suitable EAS or RFID, as the case may be, sensing gates.

SUMMARY OF THE INVENTION

According to the invention, the markers are typically inserted into the labels only after the labels have been attached to the garments. In fact to save costs, the retailer may desire to seed some of the labels on the tagged garments with dummy markers which do not have detectability. Dummy markers are used because of their lower cost.

In accordance with the invention, there is provided an improved label into which a marker can be inserted subsequent to the manufacture of the garment and after the label is attached to the garment or other article.

The invention also provides improved methods of inserting markers into labels subsequent to manufacture of labels and their attachment to garments or the like.

The invention also relates to improved tools for inserting markers into labels.

The invention also relates to improved methods of making labels for use with markers.

According to a specific embodiment of the invention, fabric label material in web form can be printed and/or woven on one or both sides with the the desired indicia. The web can be provided with openings, for example, slits at longitudinally spaced intervals before being formed into a label with a pocket. The label material can be in tubular form and the label stitched, heat sealed, or otherwise suitably closed off at longitudinally spaced intervals to provide a pocket, wherein there is one opening preferably in the form of a slit between spaced apart closed off ends of each label in the web. The printing of indicia can be performed at any stage before the labels are cut from the web, however weaving of indicia into the web is preferably done before the web is folded. Likewise, the slits can be made either before or after printing or weaving of indicia, and the slits can be made at any stage before the labels are cut from the web. The labels can be cut apart from each other and used or stacked ready for subsequent use. The labels are typically sewn into or otherwise attached to garments by the garment manufacturer and eventually shipped to a retailer for sale. The manufacturer, the manufacturer's distributor, or the retailer can utilize the invention by inserting a marker of the type described herein into the pocket through the opening in the pocket. It is preferred to have a coating of adhesive on the outside of the marker so that once the marker is inside the pocket, slight pressure between the adhesive-coated part of the marker and the inside of the pocket causes the marker to adhere to the label so that the marker cannot be removed through the opening. It is preferred that the adhesive be of a permanent, aggressive, type.

Alternatively, the marker may include a chip such as an adhesive-coated RFID chip or an elongated electromagnetically responsive element such as a long small diameter steel wire which can be detected or sensed by sending gates. By using a hollow, pointed needle which passes through the wall of the label, the chip or the wire may be passed through the needle into the pocket.

The marker can be applied through an opening in the pocket by an elongate tool having a handle and an elongate cavity having an open end opposite the handle, wherein a retainer disposed opposite the open end helps the user remove the marker from a web and hold the marker in the cavity. The improved tool assists the user in inserting the marker through the opening in the pocket.

BRIEF DESCRIPTION OF THE DIAGRAMMATIC DRAWINGS

FIG. 1 is a fragmentary elevational view of a garment showing one side of a fabric label attached thereto;

FIG. 2 is a view of the label similar to FIG. 1 but showing only the other side of the label;

FIG. 3 is a view similar to FIG. 2 wherein the label is partially cut away to show a marker;

FIG. 4 is an enlarged sectional view taken along line 4—4 of FIG. 1, wherein the marker is shown of exaggerated thickness for clarity of illustration;

FIG. 5 is an enlarged sectional view taken along line 5—5 of FIG. 1;

FIG. 6 is a perspective view of a web of markers and a tool for removing one marker at a time from the web and then capturing the marker;

FIG. 7 is a perspective view showing the marker captured by the tool just prior to being inserted through the label wall into the pocket;

FIG. 8 is a perspective view of the label with the marker carried into the pocket by the tool;

FIG. 9 is a top plan view of the tool shown in FIGS. 6 through 8;

FIG. 10 is a sectional view taken along line 10—10 of FIG. 9;

FIG. 11 is a view similar to FIG. 10 but showing a fragmentary portion of a marker in a cavity of the tool held captive by a retainer;

FIG. 12 is a sectional view taken along line 12—12 of FIG. 7;

FIG. 13 is a sectional view through a label showing a needle as having penetrated a continuous uninterrupted wall of the pocket in preparation for inserting a marker through the needle into the pocket;

FIG. 14 is an enlarged fragmentary view showing a marker being pushed into the pocket through the needle by a push rod; and FIG. 15 is a sectional view of a label with the marker of FIGS. 13 and 14 having been inserted into the pocket.

DETAILED DESCRIPTION OF THE PREFERRED EMBODIMENTS

With reference initially to FIGS. 1 through 5, there is shown a label generally indicated at 20 attached to a garment 21, only a fragmentary portion of the garment 21 being illustrated. The label 20 may be attached by a variety of means such as by heat sealing the label to the garment using a thin layer of heat seal adhesive as shown, or by sewing, or by a fastener such as a fastener sold by Paxar Corporation under the registered trademark "TAGGER TAIL". A side 20' of the label shown in FIG. 1 typically bears printed and/or woven indicia 23, as disclosed in U.S. Pat. No. 5,583,489, which patent is incorporated by reference. Such indicia, in the case of a garment, for example, can be care instructions (e.g., machine washable), garment materials, size, country of origin, and/or brand name(s). In the event of items other than garments, information appropriate to the product can be applied. A cut line 24 is also preferably printed as in U.S. Pat. No 5,583,489 and a representation of a pair of scissors 25 can also be printed on the label 20. The label 20 is shown to have another side 20" providing the remaining part of a wall 20W. The sides 20' and 20" are shown to be tubular. The label 20 is woven as a tube having one continuous, one-piece, seamless side panel or wall. Alternately, the wall 20W can be a folded web heat sealed, stitched, ultrasonically sealed, welded, adhesively bonded or otherwise attached along one side to provide a wall, or two webs or panels can be attached using any one of these techniques at their side edges to provide a tubular wall. The material of which the fabric label 20 is composed can for example be acetate, cotton, nylon, polyester and combinations thereof, in woven or non-woven form, and can be coated to enhance its durability and/or to its printability. If the label is to be used as a garment label, the label including its seams, and the printing must be able to endure repeated washings or dry cleaning, as the case may be. If the label is to be used for other less rigorous purposes, it may even be comprised of paper or the like.

Side 20" of the wall 20W has a small opening generally indicated at 27 preferably in the form of a slit 27'. The slit 27' provides a through opening into the inside of the label 20 into which a marker generally indicated at 28 can be inserted to the position shown in FIGS. 3, 5 and 8. The label 20 defines a pocket generally indicated at 20P into which the marker 28 is received. As shown, the pocket 20P is closed except for the opening 27. As shown in FIG. 5, both ends of the elongate label are sealed at 29 as by heat sealing, however, the portion of the label 20 at the place of attachment to the garment 21 can be open until sewn into or sealed to the garment 21.

The marker 28 can be of any suitable type such as a marker as illustrated of the type disclosed in U.S. Pat. Nos. 5,969,612 and 6,067,015 and sold by Sensormatic Electronics Corporation, of Boca Raton, Fla., U.S.A. The marker 28 has a hollow section or panel 30 hat-shaped in section in both the transverse and longitudinal directions as shown in respective FIGS. 4 and 5. A transparent plastic film layer 31 is sealed to a continuous flange 32 on the panel 30. The space between the panel 30 and the layer 31 inboard of the flange 32 receives a thin magnetostrictive plate or element 33. For the sake of clarity, the element 33 is shown to be suspended in air between the panel 30 and the layer 32. The element 33 is capable of vibrating when excited at a selected exciting frequency and the vibrations are capable of being sensed by a receiver. A magnetizable plate 33' is positioned captive between a transparent film or layer 34 and a transparent film or layer 34' and provides a proper magnetic bias field for the magnetostrictive plate 33. The film 34 is coated with a permanent-type, aggressive, pressure-sensitive adhesive 35 which adheres the marker 28 to the wall 20W. The edges of the layers 34, 34' and the flange 322 are secured together. The marker 18 is activated by magnetizing the plate 33' and thus the plate 33 can vibrate detectably when excited. Other types of markers such as electromagnetically detectable flat or round strips or fibers, markers with LC circuits, RFID devices and the like are within the contemplation of the invention. The size of the opening 27 need only be large enough to enable the marker 28 to be inserted therethrough. For convenience the length of the slit 27' is greater than the width of the marker 28, as shown.

FIG. 6 shows that the markers 28 are initially releasably adhered to the underside of a transparent, release coated film or web or carrier 36. The adhesive 35 removably or releasably adheres the markers 28 to the release coating on the web 36. A tool generally indicated at 37 is shown to include a one-piece elongate member 38 with a handle or handle portion 39 at one end portion of the member 38 and a cavity 40 in the form of a channel 41 at the other end portion of the member 38. The profile of the channel 41 is shown in FIG. 12 and includes a bottom wall 42 and a pair of laterally spaced lands or shelves 43 spaced from the bottom wall 42 and which terminate at ridges or guards 44. One end of the cavity 40 is open as indicated at 45, and the other end includes a retainer or keeper 46 in the form of a tang or ledge 47. The keeper 46 overhangs the cavity 40. When a marker 28 is received in the cavity 40, the flange 27 rests on the shelves 43 and the guards 44 project above the flange 27 as shown for example in FIGS. 6, 7, 8, 12 and 13. Side walls 48 of the cavity 40 squeeze the panel 30 adjacent the flange 32 to hold the marker 28 in the tool 37 after the marker 28 has been removed from the web 36. The retainer 46 helps in the removal of the markers 28, one-by-one, as by sealing the markers 28 from the web 36 and also helps retain the marker 28 in the cavity 40 while the tool 37 and the marker 28 which it carries are being inserted into the pocket 20P.

With reference to FIG. 6, the tool 37 is grasped by the handle 39 and is oriented so that the cavity 40 is aligned with a marker 28. The tool 37 is moved in the direction of arrow A so that the open end 45 and the cavity 40 receives the marker 28 until the flange 27 at the end of the marker 28 is received under the retainer 46. Whereupon the marker 28 is delaminated from the web 36 by prying or peeling. With the marker 28 captured in the cavity 40, the tool 37 is thereafter aligned with the opening 27. At this point the assembler can flex the label 20 as shown to open the pocket 20P at the opening 27. Thereupon the tool 37 with the captured marker 28 can be slid into the pocket 20P to the position shown in FIG. 8. The guards 44 keep adhesive 35 on the marker 28 from catching on the inside of the pocket 20P until the marker 28 has been fully inserted into the pocket 20P. Thereupon, the installer can pinch the sides 20' and 20" of the label 20 lightly to cause the adhesive 35 to adhere to the inside of the pocket 20P as best shown in FIGS. 4 and 5. Then the tool 37 can be withdrawn. With the adhesive 35 adhering the marker 28 in the pocket 20P, a would-be thief cannot remove the marker from the pocket 20P.

In the embodiment of FIGS. 13 through 15, the label 20A shown is identical to the label 20 except that the label 20A has a continuous uninterrupted wall 20W and has no preformed opening for insertion of the marker 28A. The label 20A has a closed pocket 20PA. A marker 28A such as an electromagnetic rod or bar member as shown is inserted through the wall 20WA through a pointed hollow needle 40. The needle is shown to have a tubular needle portion 41 with a bore or lumen 42. The needle portion 41 terminates at a point end 41' which spreads the fibers of the fabric material to make a small closeable hole 46 but preferably does not make a permanent hole in the label 20A.

After the needle is inserted as shown in FIGS. 13 and 14, a push rod 43 abuts the end of the marker 28A and pushes the marker 28A into the pocket 20PA. Thereafter, the needle 41 and the push rod 43 are withdrawn and the marker 28A resides in the pocket 20PA from which it cannot be removed. The small hole 46 made by the needle closes up after the needle 40 has been removed.

In the illustrated embodiments, the marker is inserted into the pocket 20P or 20PA after the label 20 or 20A has been made and after the label 20 or 20A has been attached to a garment. The manufacturer, distributor or retailer can selectively implant a marker 28 or 28A or the like into as many of the labels 20 or 20A as desired. Instead a dummy marker, that is one that is not functional, can be inserted through the wall of the label 20 or 20A, if desired to spare the cost of responsive markers. The markers can be pre-tested for responsiveness prior to insertion, if desired.

Other embodiments and modifications of the invention will suggest themselves to those skilled in the art, and all such of these as some within the spirit of this invention are included within the scope as best defined by the appended claims.

What is claimed is:

1. Method of making a garment label comprising: providing fabric label material capable of enduring repeated washings, thereafter forming the label material into a pocket having a wall, providing a detectable EAS or RFID marker, and inserting the marker through the wall into the inside of the pocket.

2. Method as defined in claim 1, including forming a slit in the wall through which the marker can be inserted.

3. Method as defined in claim 1, wherein the inserting step comprises inserting a pointed hollow needle through the wall and pushing the detectable marker through the hollow needle into the inside of the pocket.

4. Method as defined in claim 1, including forming an opening in the wall through which the marker can be inserted, and wherein the inserting step includes holding the marker on a tool, inserting the marker and the tool through the opening, releasing the marker from the tool inside the pocket, and withdrawing the tool through the opening.

5. Method as defined in claim 1, and providing adhesive for securing the marker to the inside of the pocket.

6. Method of making a garment label, comprising: providing fabric label material capable of enduring repeated washings, making a slit in the label material, thereafter forming the label material into an elongate pocket having closed ends, wherein the slit is spaced from the closed ends, the pocket being closed except for the slit, providing a detectable EAS or RFID marker, and thereafter inserting the marker through the slit into the pocket.

7. Method of marking a garment label, comprising: forming fabric label material capable of enduring repeated washings into a pocket with an opening, providing a tool having a cavity for receiving a marker, providing one or more EAS or RFID markers removably adhered to a carrier by adhesive on the markers, using the tool to help remove one of the markers from the carrier and to releasably capture the marker in the cavity, thereafter inserting the tool with its captured marker through the opening to a position where the marker is inside the pocket, applying pressure to the label and the marker to adhere the marker adhesively to the inside of the pocket, and removing the tool from the pocket.

8. A garment label, comprising: a pocket having an elongate wall with closed ends, the pocket being composed of fabric label material capable of enduring repeated washings, a slit in the wall of the pocket, the slit being spaced from the closed ends, a detectable EAS or RFID marker disposed in the pocket, the marker being insertable through the slit into the pocket, the slit being sized to receive the marker, and adhesive adhering the marker to the inside of the wall of the pocket to prevent withdrawal of the marker through the slit.

9. A garment label as defined in claim 8, wherein the wall is tubular.

10. A garment label as defined in claim 8, wherein the slit extends generally transversely of the elongated wall.

11. A garment label as defined in claim 8, wherein the pocket is closed except for the slit.

12. A garment label as defined in claim 8, wherein one end includes a portion for attachment to a garment.

13. A garment label, comprising: a pocket having an elongate wall with closed ends, the pocket being composed of fabric label material capable of enduring repeated washings, a slit in the wall of the pocket and spaced from the closed ends, the pocket being closed except for the slit, a detectable EAS or REID marker disposed in the pocket, the marker being insertable through the slit in the pocket, the slit being sized to receive the marker, and one end of the pocket including a portion for attachment to a garment.

14. A garment label as defined in claim 13, wherein the slit extends generally transversely.

15. A garment label as defined in claim 13, wherein the wall is tubular.

* * * * *